US012715290B1

(12) United States Patent
Hamidi Shishavan et al.

(10) Patent No.: US 12,715,290 B1
(45) Date of Patent: Aug. 25, 2026

(54) DRIVING ENVIRONMENT GAMIFICATION

(71) Applicant: Toyota Motor Engineering & Manufacturing North America, Inc., Plano, TX (US)

(72) Inventors: Hossein Hamidi Shishavan, New Britain, CT (US); Danny J. Lohan, West Bloomfield, MI (US); Sean P. Rodrigues, Ann Arbor, MI (US); Paul Donald Schmalenberg, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 19/063,789

(22) Filed: Feb. 26, 2025

(51) Int. Cl.

| | |
|---|---|
| ***G06K 9/62*** | (2022.01) |
| ***B60K 35/235*** | (2024.01) |
| ***B60W 40/08*** | (2012.01) |
| ***G06K 9/00*** | (2022.01) |

(52) U.S. Cl.
CPC ........... *B60K 35/235* (2024.01); *B60W 40/08* (2013.01); *B60K 2360/177* (2024.01)

(58) Field of Classification Search
CPC ................................ B60K 35/28; B60K 35/10
See application file for complete search history.

(56) References Cited

U.S. PATENT DOCUMENTS

| | | | | |
|---|---|---|---|---|
| 11,039,279 | B1 * | 6/2021 | Peterson | G06F 3/011 |
| 11,186,241 | B2 | 11/2021 | Sobhany | |
| 11,307,650 | B1 | 4/2022 | Guerra Filho et al. | |
| 11,405,469 | B2 * | 8/2022 | Hodge | G06F 21/31 |
| 11,858,349 | B1 * | 1/2024 | Kennerly | B60K 35/233 |
| 2010/0134302 | A1 | 6/2010 | Ahn et al. | |
| 2015/0062118 | A1 * | 3/2015 | Ebner | G06F 3/04815 345/419 |
| 2016/0077547 | A1 | 3/2016 | Aimone et al. | |
| 2016/0368417 | A1 * | 12/2016 | Bassi | H04N 23/13 |
| 2017/0021282 | A1 * | 1/2017 | Comploi | G05D 1/0088 |
| 2017/0046578 | A1 * | 2/2017 | Phillips | H04N 23/635 |
| 2017/0162072 | A1 * | 6/2017 | Horseman | A61B 5/6803 |
| 2017/0200449 | A1 | 7/2017 | Penilla et al. | |
| 2018/0118218 | A1 | 5/2018 | Miloser | |
| 2018/0255285 | A1 * | 9/2018 | Hall | A63F 13/213 |
| 2019/0228262 | A1 * | 7/2019 | Gonzalez | A63F 13/65 |
| 2021/0005224 | A1 | 1/2021 | Rothschild et al. | |
| 2021/0076090 | A1 | 3/2021 | Aimone et al. | |
| 2023/0173683 | A1 * | 6/2023 | Gomez | G06N 3/09 700/246 |
| 2023/0264697 | A1 | 8/2023 | Yasuda et al. | |

FOREIGN PATENT DOCUMENTS

| | | | |
|---|---|---|---|
| WO | 2023288089 | A1 | 1/2023 |

* cited by examiner

*Primary Examiner* — Nan-Ying Yang
(74) *Attorney, Agent, or Firm* — Christopher G. Darrow; Darrow Mustafa PC

(57) ABSTRACT

A recreation of a driving environment of a vehicle can be gamified based on a determined emotional state of a vehicle occupant and/or a user preference. The gamified recreation of the driving environment can be caused to be presented on a display of a device.

27 Claims, 9 Drawing Sheets

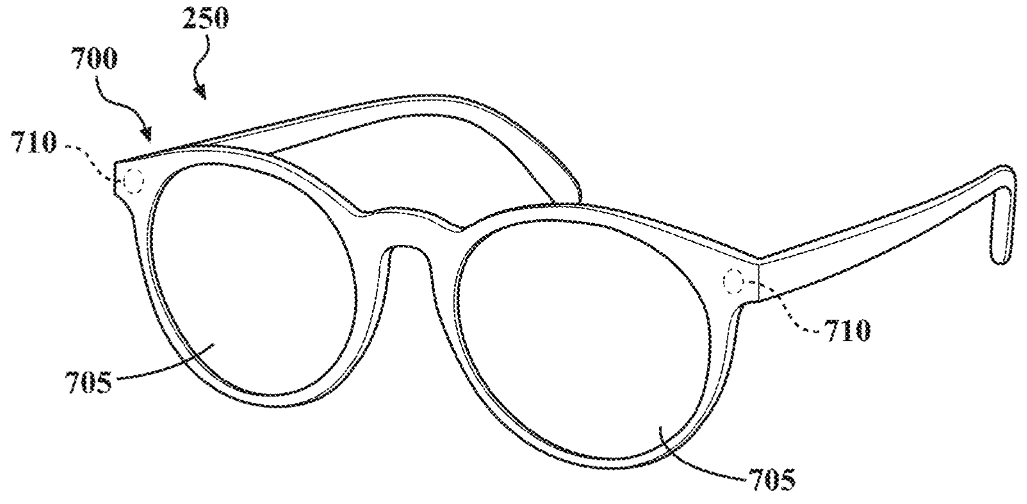
FIG. 7A
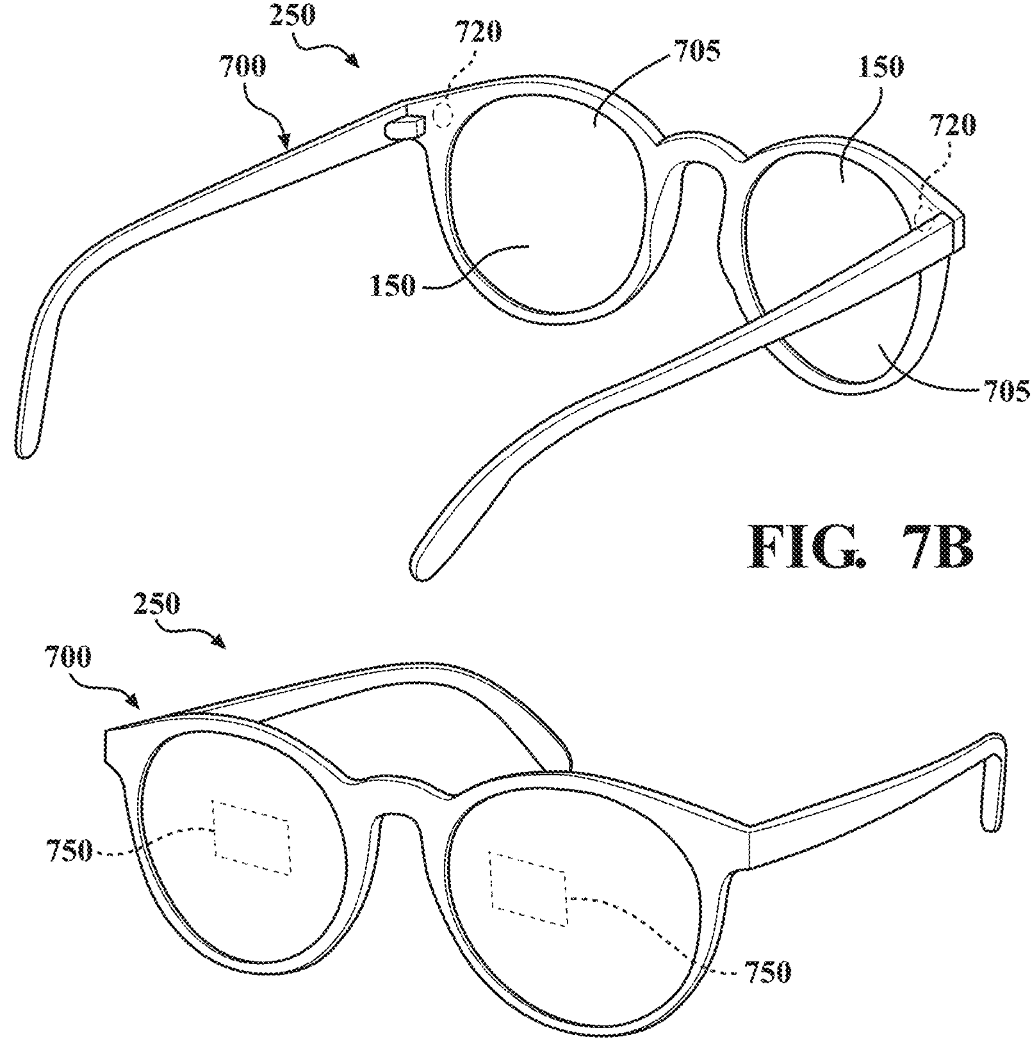
FIG. 7B
FIG. 7C 800
134'
134'
134'
134'
134'
134'
134'
134
134
134
134
134
134
134
810
100

DRIVING ENVIRONMENT GAMIFICATION

FIELD

The subject matter described herein relates in general to vehicles and, more particularly, to enhancing vehicle occupant perception of a driving environment.

BACKGROUND

Current vehicles have limited driver support features built into the vehicle. Examples of such driver support features include blind spot identification systems, heads-up displays for navigation, and some semi-automated cruise control and braking features. Third party systems, like various mapping programs, may alert a driver of oncoming construction, police, or traffic accidents.

SUMMARY

In one respect, the subject matter presented herein relates to a method. The method includes gamifying a recreation of a driving environment of a vehicle based on a determined emotional state of a vehicle occupant and/or a user preference. The method also includes causing the gamified recreation of the driving environment to be presented on a display of a device.

In another respect, the subject matter presented herein relates to a system. The system includes a device with a display. The system includes a processor. The processor is configured to gamify a recreation of a driving environment of a vehicle based on a determined emotional state of a vehicle occupant and/or a user preference. The processor is further configured to cause the gamified recreation of the driving environment to be presented on the display.

BRIEF DESCRIPTION OF THE DRAWINGS

FIG. 7A is an example of extended reality glasses, showing an outside view of the glasses.

FIG. 7B is an example of extended reality glasses, showing an inside view of the glasses.

FIG. 7C is an example of extended reality glasses, showing a gamified driving environment presented on a portion of each lens.

DETAILED DESCRIPTION

Figure 1:
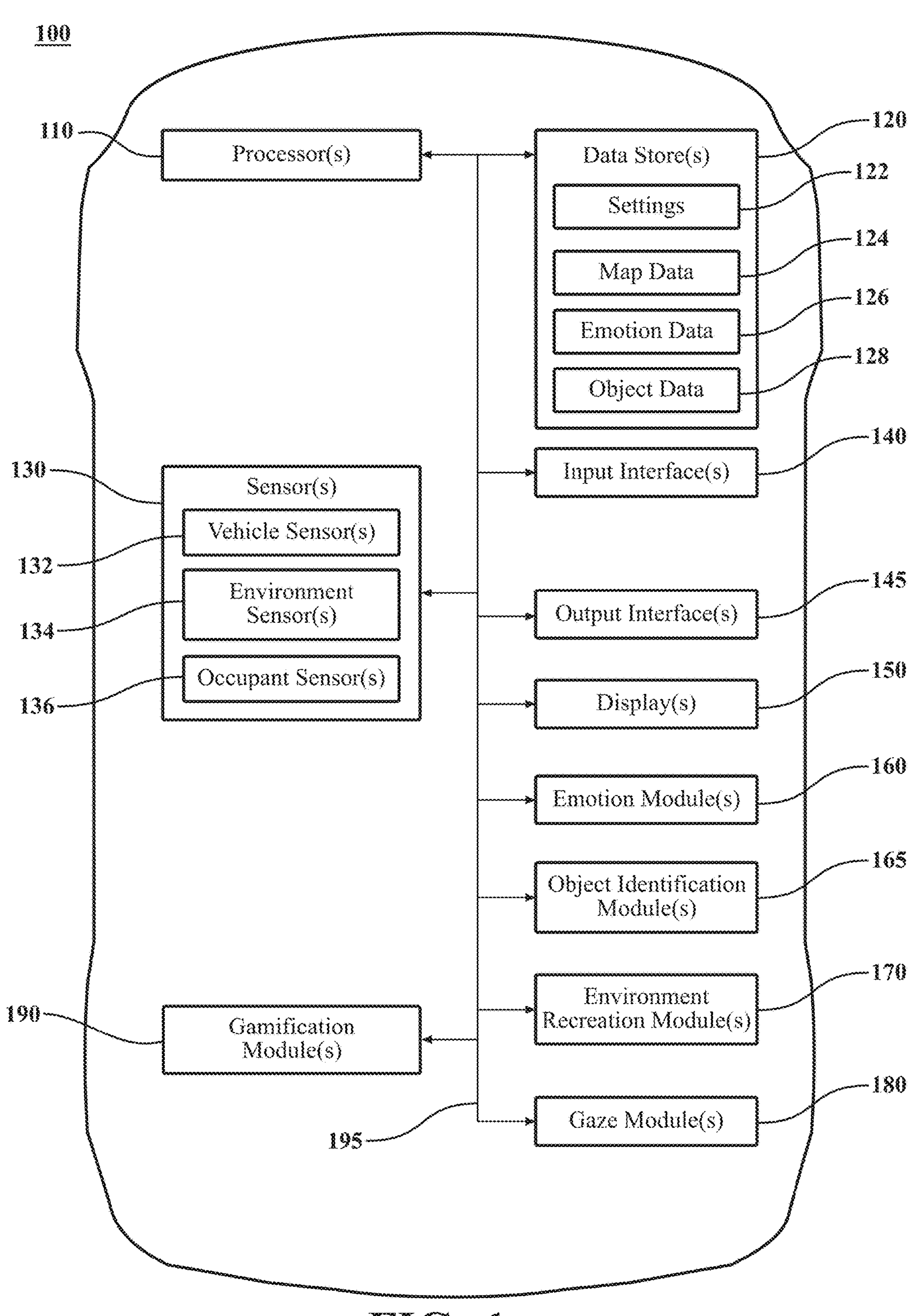
FIG. 1 is an example of a vehicle.

Third party mapping programs are reliant on voluntary reporting. Consequently, a driver must remain alert when using these systems due to incomplete information. Some locations or routes can be monotonous, such as driving on long highways with little change in scenery or rural areas with few landmarks or points of interest. Moreover, repeatedly driving the same route, typically for work commutes, can lead to commuter fatigue and decreased alertness. Furthermore, driving through specific locations can trigger memories of past negative experiences that can cause discomfort, anxiety, or distress while driving, potentially affecting concentration and safety. Also, there are other potential risks from moving or stationary objects in the environment that require more attention. These issues can lead to a less engaging driving experience and potentially increase the risk of drowsiness, inattention, and/or risk of accidents.

To mitigate these issues, arrangements described herein can gamify a recreation of a driving environment of a vehicle based on a determined emotional state of a vehicle occupant and/or a user preference. The gamification can include emphasizing, deemphasizing, and/or removing objects in the driving environment. Alternatively or additionally, the gamification can include remaking the driving environment with more delightful or interesting features. The gamified recreation of the driving environment can be presented on a display of a device, such as an extended reality device. The gamified recreation can boost driver mood, alertness, and/or emotional state.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a vehicle 100. As used herein, "vehicle" means any form of motorized or powered transport. In one or more implementations, the vehicle 100 can be an automobile, a land-based craft, a watercraft, an aircraft, or any other form of motorized or powered transport. The vehicle 100 may be operated manually by a human driver, semi-autonomously by a mix of manual inputs from a human driver and autonomous inputs by one or more vehicle computers, fully autonomously by one or more vehicle computers, or any combination thereof. The vehicle 100 can be configured to switch between these different operational modes.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be located on or within a vehicle, it will be understood that one or more of these elements can be located external to the vehicle. Thus, such elements are not located on, within, or otherwise carried by the vehicle. Further, the elements shown may be physically separated by large distances. Indeed, one or more of the elements can be located remote from the vehicle 100. Some of the elements can be components of the vehicle 100 while some of the elements may not be components of the vehicle 100.

The vehicle 100 can include one or more processors 110, one or more data stores 120, one or more sensors 130, one or more input interfaces 140, one or more output interfaces 145, one or more displays 150, one or more emotion modules 160, one or more object identification modules 165, one or more environment recreation modules 170, one or more gaze modules 180, and/or one or more gamification modules 190. Each of these elements will be described in turn below.

As noted above, the vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The vehicle 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In one or more arrangements, the data store(s) 120 can include settings data 122. The settings data 122 can include any data or information useful for gamifying a driving environment recreation. Depending on user preference, a driving environment recreation can be gamified as much as needed while keeping/highlighting the key features that correspond to road safety to improve the user experience. The settings data 122 can be set by a vehicle occupant, vehicle manufacturer, or some other entity.

In some arrangements, the settings data 122 can include one or more pre-defined template structures. The template structures can include one or more themes, motifs, or styles that can be used to gamify the driving environment recreation. For instance, the template structures can be of a particular artist or art movement (e.g., a Pablo Picasso style or an impressionist style), a particular movie or television program (e.g., a Star Wars style), a particular book or book series, a particular time period or event in history (e.g., the 1930s, the 1980s, $19^{th}$ century, the future, period costume, vintage car, etc.), a particular location or setting (e.g., tropical island, desert, etc.), or a particular company (e.g., Toyota). The template structures can be used to replace or cover, by virtual overlays or otherwise, objects in the driving environment recreation. A user can select one of the template structures to be used for gamification.

The settings data 122 can include a library of user preferences. The user preferences can include unfavorable environmental factors and favorable environmental factors. Examples of unfavorable environmental factors can include cloudy skies, dark skies, rain, sparse landscapes, garbage, litter, pollution, certain objects, certain colors, etc. Examples of favorable environmental factors can include sunny skies, sunsets, beautiful or interesting landscapes, clean streets or clean sidewalks, etc. The user preferences can include which objects/environment features that are to be removed, deemphasized, emphasized, and/or the manner in which such objects/environment features are presented.

The settings data 122 can include a library of critical objects and non-critical objects in a driving environment. A critical object can include an object that is important to the ability to safely operate the vehicle or an object or area that could be hazardous to the ability to safely operate the vehicle. An object can be considered a critical object by its nature and/or by its location in the driving environment. Non-limiting examples of the critical objects can include vehicles, pedestrians, animals, and objects located on a road. A non-critical object can include an object or an area that is not important to the ability to safely operate the vehicle or an object or area that is not hazardous to the ability to safely operate the vehicle. Whether an object is considered critical or non-critical can be set by a vehicle occupant, vehicle manufacturer, or some other entity.

In one or more arrangements, the data store(s) 120 can include map data 124. The map data 124 can include maps of one or more geographic areas. In some instances, the map data 124 can include information or data on roads, traffic control devices, road markings, streetlights, structures, features, buildings, and/or landmarks in the one or more geographic areas. The map data 124 can be in any suitable form. In some instances, the map data 124 can include aerial views of an area. In some instances, the map data 124 can include ground views of an area, including 360-degree ground views. The map data 124 can include measurements, dimensions, distances, positions, coordinates, and/or information for one or more items included in the map data 124 and/or relative to other items included in the map data 124. The map data 124 can include a digital map with information about road geometry. In one or more arrangements, the map data 124 can include information about the ground, terrain, roads, surfaces, and/or other features of one or more geographic areas. The map data 124 can include elevation data in the one or more geographic areas. The map data 124 can define one or more ground surfaces, which can include paved roads, unpaved roads, land, and other things that define a ground surface. The map data 124 can be high quality and/or highly detailed.

In one or more arrangements, the data store(s) 120 can include emotion data 126. The emotion data 126 can include data or information about relationships, correlations, and/or links between biodata and emotional states. The emotion data 126 can include general emotion-related data and/or emotion-related data with respect to a particular vehicle occupant. In one or more arrangements, the data store(s) 120 can store biodata markers, signatures, measurements, thresholds, ranges, and/or profiles with respect to particular emotional states. In one or more arrangements, the data store(s) 120 can store biodata or occupant data acquired by one or more elements described herein.

In one or more arrangements, the data store(s) 120 can include object data 128. The object data 128 can include information about a plurality of different objects in a driving environment of a vehicle. Examples of the object data 128 can include vehicles, people, animals, buildings, structures, roads, medians, signs, streetlights, traffic lights, traffic signs, road signs, barriers, flares, traffic cones, billboards, bridges, poles, towers, trees, and/or plants, just to name a few possibilities. The object data 128 can include one or more images of the objects. The object data 128 can include size, measurements, and/or dimensions of the objects, including averages, percentiles, and ranges. The object data 128 can include any information about an object that can help to identify such an object when detected by one or more sensors.

In some arrangements, the object data 128 can include classification information about the objects in the object data 128. For instance, the classification information can include whether the object is a critical object or a non-critical object. A critical object can include an object or area that is important to the ability to safely operate the vehicle or an object or area that could be hazardous to the ability to safely operate the vehicle. Non-limiting examples of critical objects include vehicles, pedestrians, and animals, road signs, just to name a few possibilities. A non-critical object can include an object or an area that is not important to the ability to safely operate the vehicle or an object or area that is not hazardous to the ability to safely operate the vehicle. Whether an object is considered critical or non-critical can be set by a vehicle occupant, vehicle manufacturer, or some other entity.

The vehicle 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 132. The vehicle sensor(s) 132 can be configured to detect, determine, assess, monitor, measure, quantify and/or sense information about the vehicle 100 itself (e.g., position, location, orientation, speed, acceleration, heading, etc.). As an example, the vehicle 100 can include one or more speedometers. Further, the vehicle sensor(s) 132 can be configured to detect, determine, assess, monitor, measure, quantify and/or sense information about a cabin of the vehicle 100, such as cabin temperature. The vehicle sensor(s) 132 can be any suitable sensor, now known or later developed.

The sensor(s) 130 can include one or more driving environment sensors 134. Such sensors can be used to detect, determine, assess, monitor, measure, quantify, acquire, and/or sense, directly or indirectly, something about the external or driving environment of the vehicle 100. For instance, one or more of the driving environment sensors 134 can be used to detect, determine, assess, monitor, measure, quantify, acquire, and/or sense, directly or indirectly, the presence of one or more objects in the driving environment of the vehicle 100, the position or location of each detected object relative to the vehicle 100, the distance between each detected object and the vehicle 100 in one or more directions (e.g., in a longitudinal direction, a lateral direction, and/or other direction(s)), the elevation of a detected object, the speed of a detected object, the acceleration of a detected object, the heading angle of a detected object, and/or the movement of each detected obstacle. The driving environment sensor(s) 134 can be any suitable sensor, now known or later developed. In one or more arrangements, the driving environment sensor(s) 134 can include one or more radar sensors, one or more lidar sensors, one or more sonar sensors, one or more cameras, one or more other type of sensors, and/or any combination thereof.

Figure 8:
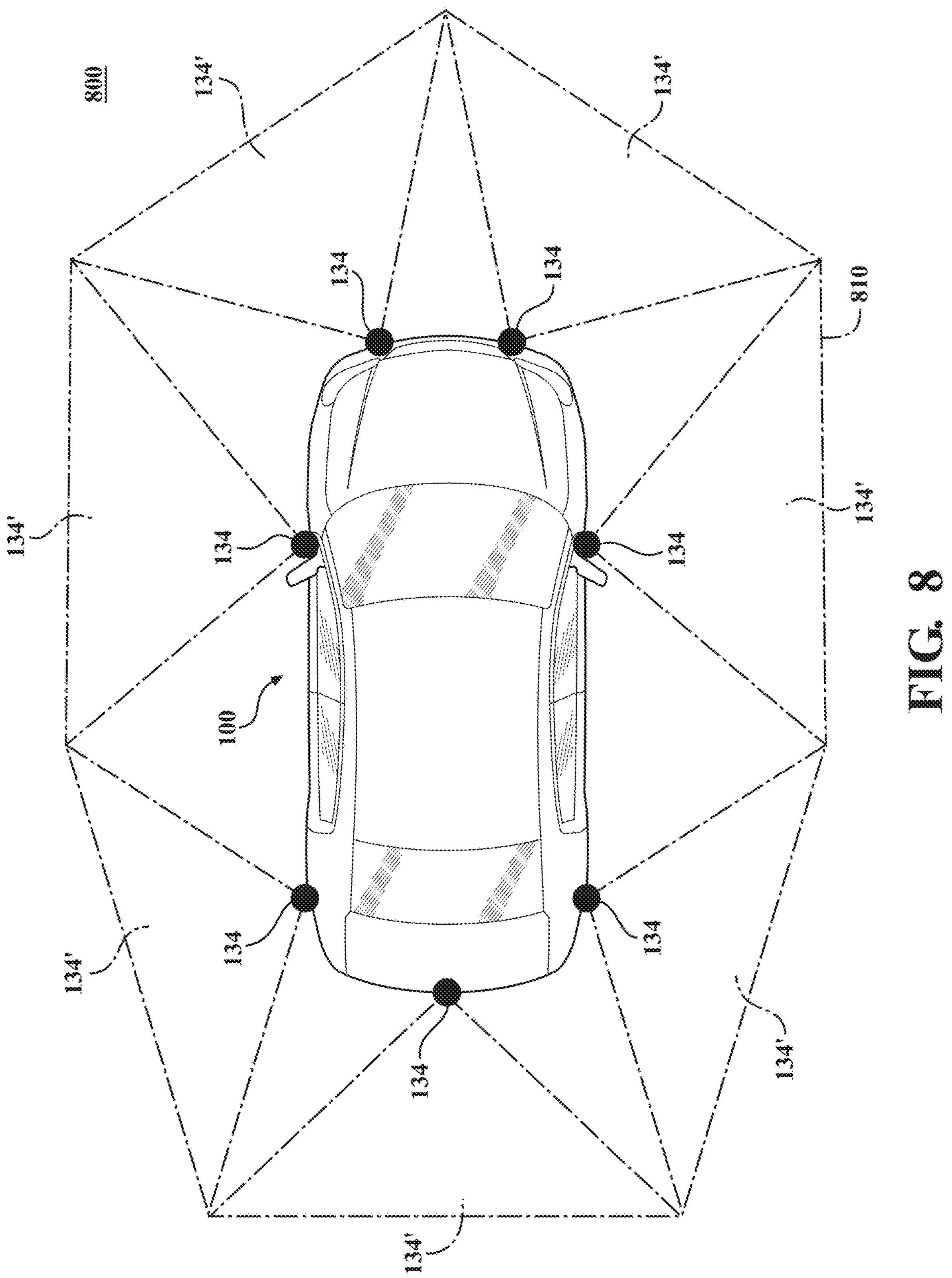
FIG. 8 shows an example of a vehicle equipped with sensors that acquire surrounding driving environment data.

The driving environment sensor(s) 134 can collectively capture a substantially 360 view about the vehicle 100 in real-time. The driving environment sensor(s) 134 can provide depth information. Referring to FIG. 8, the vehicle 100 can be located in a driving environment 800. A plurality of driving environment sensors 134 can be distributed about the vehicle 100. Each driving environment sensor 134 (or group of driving environment sensors 134) can have a detection field 134'. In some arrangements, the detection fields 134' can have substantially identical ranges from the vehicle and/or coverage areas. Alternatively, one or more of the detection fields 134' can be different from the other detection fields 134' in one or more respects, such as range and/or coverage area.

In some arrangements, at least some of the neighboring detection fields 134' can overlap each other. In some arrangements, at least some of the neighboring detection fields 134' can be substantially adjacent to each other. The detection fields 134' can define a perimeter 810 about the vehicle 100.

The sensor(s) 130 can include one or more occupant sensors 136. The occupant sensor(s) 136 can be configured to detect, determine, assess, monitor, measure, quantify and/or sense information about an occupant (e.g., driver and/or passenger) of the vehicle 100.

In one or more arrangements, the occupant sensor(s) 136 can be configured to detect the presence of an occupant. In one or more arrangements, the occupant sensor(s) 136 can be configured to detect the weight of an occupant.

In one or more arrangements, the occupant sensor(s) 136 can include one or more biosensors. The biosensor(s) can be configured to acquire biodata of an occupant (i.e., a human being). Biodata includes any biological data, biomarkers, physiological data, and/or psychological data that can be analyzed to determine a state or condition of a user, such as an emotional state. Non-limiting examples of the biodata can include heart rate, electrodermal activity, breathing, facial expressions, sweat glucose (to monitor blood sugar), blood pressure, galvanic skin response (to measure degrees of arousal), temperature, perspiration, sodium and potassium (to measure dehydration), and/or other physiological responses. The acquired biodata can be used to determine an emotional state of a vehicle occupant.

The biosensor(s) can operate in various suitable manners, such as through direct contact or non-contact methods. In some arrangements, the biosensor(s) can be configured to acquire biodata by direct contact with a body portion of a human being, such as a portion of a human's hand, finger, thumb, arm, forearm, forehead, head, neck, leg, or any combination thereof. The biosensor(s) can be provided in any suitable location within the vehicle 100. The biosensor(s) can be mounted on or integrated into one or more vehicle components. In one or more arrangements, the biosensor(s) can be located in or on the steering wheel, seat, arm rest, or head rest.

In one or more arrangements, the occupant sensor(s) 136 can include one or more gaze sensors. The gaze sensor(s) can be any type of sensor, now known or later developed, that is configured to detect, determine, assess, monitor, measure, quantify and/or sense information about a direction that a vehicle occupant (e.g., driver and/or passenger) is looking. In some arrangements, the gaze sensor(s) can be configured to monitor a vehicle occupant continuously, periodically, irregularly, or even randomly. The gaze sensor(s) can be any suitable sensor, now known or later developed. In one or more arrangements, the gaze sensor(s) can include one or more cameras, one or more eye sensors, one or more head sensors, one or more face sensors, one or more eye movement sensors, one or more eye tracking sensors, one or more eye position sensors, one or more eye orientation sensors, one or more head movement sensors, one or more head tracking sensors, one or more head position sensors, one or more head orientation sensors, and/or one or more gaze tracking sensors, just to name a few possibilities. The gaze sensor(s) can determine or can acquire data which can be used to determine a line of sight of a vehicle occupant. In some arrangements, such as when one or more vehicle windows are used as a display, the gaze line can be determined based on the vehicle's position or coordinates rather than the driver's position.

The gaze sensor(s), such as one or more cameras, can be mounted in the windshield, in the frame of the windshield, on a rear-view mirror, on the dashboard, or mounted or suspended from the roof of the car, such that the eyes can be analyzed relative to the normal vector of vision for reading the road and vehicles that are on the same trajectory, oncoming, or traveling in a perpendicular direction. The gaze sensor(s) can be embedded in or mounted on a side-view mirror to permit determination that the gaze is directed to the side-view mirror. Alternatively or additionally, the gaze sensor(s) can be mounted on or integrated into one or more vehicle components. Alternatively or additionally, the gaze sensor(s) can be integrated into a device worn by a vehicle occupant, such as an extended reality device as described herein. In some arrangements, the gaze sensor(s) can contain optical components that can move (e.g., rotate and/or translate) to determine eye angles, head angles, eye position, head position, and/or eyelid position or to acquire information or data that can be used to determine eye angles, head angles, eye position, head position, and/or eyelid position.

The vehicle 100 can include one or more input interfaces 140. An "input interface" includes any device, component, system, element or arrangement or groups thereof that enable information/data to be entered into a machine. The input interface(s) 140 can receive an input from a user (e.g., a person) or other entity. Any suitable input interface(s) 140 can be used, including, for example, a keypad, display, touch screen, multi-touch screen, button, joystick, mouse, track-ball, microphone, gesture recognition (radar, lidar, camera, or ultrasound-based), and/or combinations thereof. In some arrangements, the input interface(s) 140 can be a communication device, such as a smart phone, tablet computer, and/or other portable computing device. In some arrangements, the input interface(s) 140 can be presented on a display of a communication device, such as by application software running on and/or accessed by the communication device.

The vehicle 100 can include one or more output interfaces 145. An "output interface" includes any device, component, system, element or arrangement or groups thereof that enable information/data to be presented to a user (e.g., a person) or other entity. The output interface(s) 145 can present information/data to a user or other entity. The output interface(s) 145 can include a display, an earphone, a haptic device, a projector, and/or speaker. Some components of the vehicle 100 may serve as both a component of the input interface(s) 140 and a component of the output interface(s) 145.

The vehicle 100 can include one or more displays 150. The display(s) 150 can be any suitable type of display, now known or later developed. In some arrangements, the display(s) 150 can be part of another device located in the vehicle 100 and/or operatively connected to the vehicle 100. For example, the display(s) 150 can be part of an augmented reality device, as will be explained in greater detail in connection with FIG. 2. The display(s) 150 can be part of a device worn by a vehicle occupant.

In some arrangements, the display(s) 150 can be a part of the input interface(s) 140 and/or the output interface(s) 145. In one or more arrangements, the display(s) 150 can be a part of the vehicle 100, such as a display integrated into an instrument panel or head unit of the vehicle 100. For instance, the display(s) 150 can be an infotainment display located within the vehicle 100. In some arrangements, the display(s) 150 can be formed by a projector projecting the video onto a surface within the vehicle 100, such as by a heads-up display. For instance, video can be presented on a window (e.g., front windshield, side window, etc.) or an instrument panel of the vehicle 100. In some arrangements, the display(s) 150 can include one or more transparent displays formed with, embedded in, or otherwise associated with the glass of a window.

In some arrangements, the display(s) 150 can be configured to present a view corresponding to a view of a driver. The view presented on the display(s) 150 can vary with movements of the driver's head and/or eyes. The display(s)

150, the device of which the display(s) 150 are a part of, and/or the vehicle 100 can include eye tracking or head tracking such that, as the field of vision of the person changes, the content presented on the display(s) 150 changes.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or additionally, one or more data stores 120 may contain such instructions.

The vehicle 100 can include one or more emotion modules 160. The emotion module(s) 160 can include profiles and logic for determining an emotional state of a vehicle occupant. The emotion module(s) 160 can be configured to do so in any suitable manner, such as by using any suitable techniques, now known or later developed. For instance, the emotion module(s) 160 can be configured to analyze biodata acquired by the occupant sensor(s) 136 (e.g., the biosensor(s)). The emotion module(s) 160 can retrieve raw data from the occupant sensor(s) 136 and/or from the data store(s) 120 (e.g., the emotion data 126). The emotion module(s) 160 can also retrieve emotion data from any suitable data source.

In some instances, the emotion module(s) 160 can take into account other inputs, such as user inputs provided on the input interface(s) 140 and/or vehicle data acquired by the vehicle sensor(s) 132. For instance, user biodata coupled with the current vehicle cabin temperature may indicate that the user is uncomfortably hot or cold. In other arrangements, the emotion module(s) 160 can determine whether a user is excited or aroused based on the user biodata.

The emotion module(s) 160 can analyze the user biodata to detect an emotional state or condition. For instance, the emotion module(s) 160 can compare the acquired user biodata to a library of emotional states or conditions to determine which emotional state(s) or condition(s) the vehicle occupant may have and/or eliminate which emotional state(s) or condition(s) the occupant does not have. Further, the emotion module(s) 160 can compare the acquired user biodata to biodata ranges or symptoms of various emotional state(s) or condition(s). The emotion module(s) 160 can be configured to use big data to detect an emotional state or condition. The emotion module(s) 160 can be configured to measure a vehicle occupant's emotional state through physiological signals to understand how each feature and mode affects their mood, alertness, and emotion.

By analyzing biodata, the emotion module(s) 160 can use algorithms to estimate the vehicle occupant's emotional state to infer how the person is feeling, whether they are stressed, calm, or experiencing any other emotional response. To estimate emotions, the emotion module(s) 160 can employ various algorithms. In one approach, machine learning classifiers, such as neural networks, can be used. This algorithm can be trained on labeled physiological or emotion data to recognize patterns associated with different emotional states. Labeled data can be recorded through one or more calibration sessions where different types of gamification are shown to the vehicle occupant with different themes.

In some arrangements, the emotion module(s) 160 can track the gaze of the vehicle occupant. The emotion module(s) 160 can track real-time biodata when an occupant is looking at a particular object in the driving environment. The emotion module(s) can determine a vehicle occupant's real-time reactions or responses, which can be sent to the gamification module(s) 190.

The gamification module(s) 190 can determine what objects or things to emphasize, deemphasize, or remove from a driving environment recreation based on the vehicle occupant's real-time reactions or responses. For instance, if a particular object causes the vehicle occupant to experience stress or anxiety as evidenced by the biodata, the gamification module(s) 190 can deemphasize or remove that object (or that class of objects) from the driving environment recreation. On the other hand, if a particular object causes the vehicle occupant to respond happily or otherwise positively as evidenced by the biodata, the gamification module(s) 190 can emphasize that object (or that class of objects) in the driving environment recreation.

The gamification module(s) 190 can measure or use measured driver attention to detect insufficient focus in potentially critical situations, such as when approaching pedestrians or red lights. In such cases, the gamification module(s) 190 can add emphasis to highlight these risks.

The gamification module(s) 190 can also detect emotions or use emotion detection for gamification and/or selecting specific environments. For instance, the gamification module(s) 190 can gamify a busy area in a way so that a driver (or other vehicle occupant) remains calm.

The vehicle 100 can include one or more object identification modules 165. The object identification module(s) 165 can analyze sensor data captured by the sensor(s) 130 (e.g., the driving environment sensor(s) 134) to detect, identify, and/or classify an object. The object identification module(s) 165 can use any suitable technique, including, for example, template matching and other kinds of computer vision and/or image processing techniques and/or other artificial or computational intelligence algorithms or machine learning methods. The object identification module(s) 165 can include any suitable object recognition software. The object identification module(s) 165 can apply real-time algorithms to process visual data (e.g., images or video) captured by the driving environment sensor(s) 134 to identify objects in the driving environment.

The object identification module(s) 165 can query an object image database for possible matches. For instance, visual data (e.g., images or video) captured by the driving environment sensor(s) 134 (such as cameras) can be compared to visual data in the object data 128 for possible matches. Alternatively or additionally, measurements or other aspects of an object in the environment data can be compared to measurements or other aspects of any images in the object data 128.

The object identification module(s) 165 can identify a detected object as a particular object if there is a match between the captured image/data of the object and an image or data in the object data 128. "Match" or "matches" means that an image or other information collected by the sensor(s) 130 and one or more of the images or other information in the object data 128 are substantially identical. For instance, an image or other information collected by the sensor(s) 130 and one or more of the images or other information in the object data 128 can match within a predetermined probability (e.g., at least about 85%, at least about 90%, at least about 95% or greater) or confidence level. In one or more arrangements, the detected object can be compared to identifying features of an object, such as color measured visually, shape, size, movement, sounds, etc.

Alternatively or additionally, the object identification module(s) 165 can use semantic segmentation on the video captured by the driving environment sensor(s) 134. Thus, the object identification module(s) 165 can interpret pixels in the video into a semantic meaning. The object identification module(s) 165 can be configured to define or label individual pixels in the video as belonging to an individual object.

The object identification module(s) 165 can be configured to classify an identified object as a critical object or a non-critical object. A critical object can include an object or area that is important to a person's ability to safely operate the vehicle. A non-critical object can include an object or an area that is not important to a person's ability to safely operate the vehicle or an object or area that could be hazardous to a person's ability to safely operate the vehicle. The object identification module(s) 165 can do so based on classification information stored in the object data 128. However, the object identification module(s) 165 can do so in any suitable manner.

Figure 2:
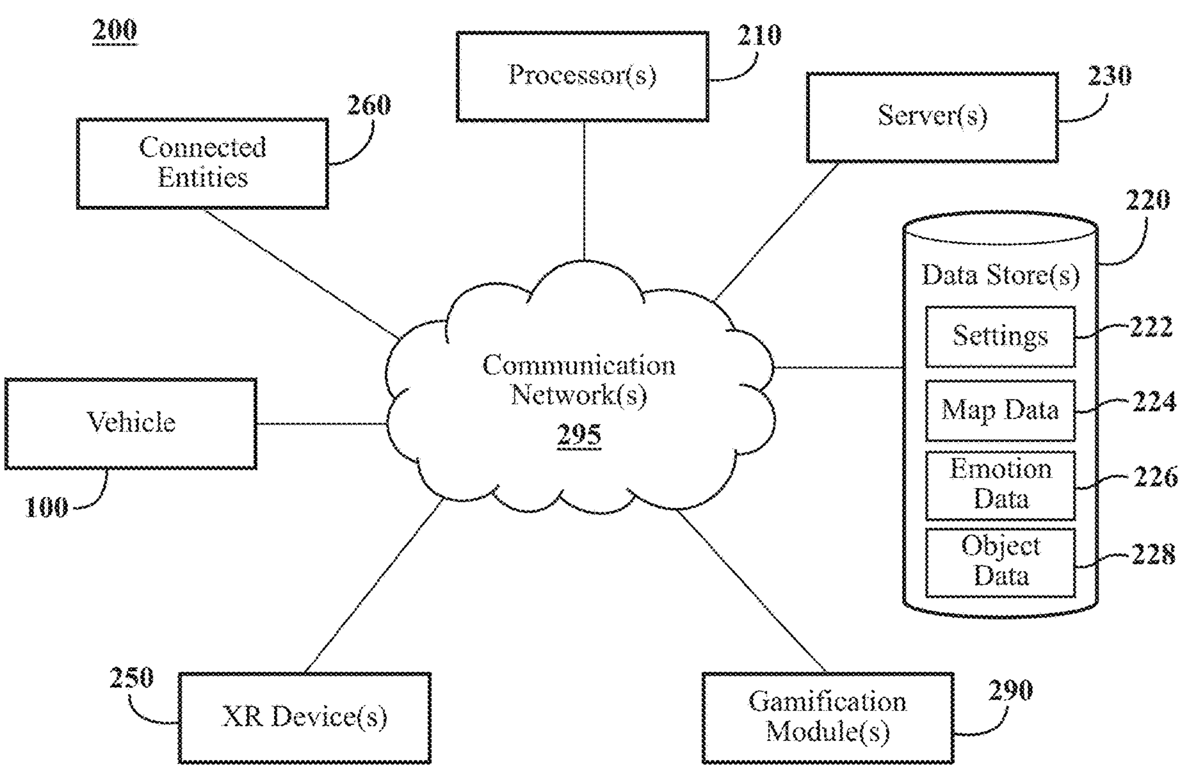
FIG. 2 is an example of a system.

The vehicle 100 can include one or more environment recreation modules 170. The environment recreation module(s) 170 can be configured to receive driving environment data from the vehicle 100, such as from the driving environment sensor(s) 134. In some instances, the environment recreation module(s) 170 can be configured to receive driving environment data from other sources, such as one or more connected entities 260 (FIG. 2). In such case, the driving environment data can be sent by the connected entities 260 directly to the vehicle 100 or indirectly, such as by one or more servers 230 (FIG. 2).

The environment recreation module(s) 170 can be configured to generate a driving environment recreation of the area surrounding the vehicle 100. The environment recreation module(s) 170 can use the map data 124 and the driving environment data from the vehicle 100 and/or the connected entities 260 to generate the driving environment recreation. The driving environment can be a visual representation of the driving environment surrounding the vehicle 100. The driving environment recreation can be a 360 degree map that is consistent with real-time conditions in the driving environment. The driving environment recreation can be viewed from different perspectives, such as from the driver's perspective, a passenger's perspective, and/or from one or more perspectives from outside of the vehicle (e.g., an overhead view). The driving environment recreation can include a video or images of the driving environment, such as acquired by the driving environment sensor(s) 134 (e.g., the camera(s)).

The driving environment recreation can be stored in the data store(s) 120. In some arrangements, the driving environment recreation can be presented on the display(s) 150. In some arrangements, the display(s) 150 can be integrated into vehicle window(s) or windshield(s). In some arrangements, the display(s) 150 can be integrated into a wearable device, such as glasses.

The vehicle 100 can include one or more gaze modules 180. The gaze module(s) 180 can be configured to determine a direction in which a vehicle occupant is looking. The gaze module(s) 180 can do so in any suitable manner. For example, the gaze module(s) 180 can be configured to analyze gaze data acquired by the occupant sensor(s) 136. Using the gaze data, the gaze module(s) 180 can be configured to determine a direction that a driver is looking, such as a driver's line of sight. The gaze module(s) 180 can be configured to do so by determining a head position, head orientation, eye position, eye orientation, and/or gaze of the driver using any suitable techniques, now known or later developed. The gaze module(s) 180 can use any form of eye tracking, now known or later developed. The view of the driving environment recreation can be changed based on determinations made by the gaze module(s) 180.

The vehicle can include one or more gamification modules 190. As used herein, "gamify" or "gamification" includes some alteration to a driving environment recreation. The alteration can include adding objects, deleting objects, virtual overlays, emphasizing, or deemphasizing object(s) or portion(s) of the driving environment, and/or transforming objects or the driving environment (or one or more portions thereof) into different objects/environment portions if their alteration does not adversely influence safe driving. In some instances, a gamified driving environment recreation may appear to be natural and realistic. In some instances, a gamified driving environment recreation may appear to be highly virtualized. When a driving environment recreation is gamified, critical features or objects in the driving environment (that correspond to driving safety) are kept as is or highlighted. The gamification module(s) 190 can be configured to understand environmental features and objects that correlate with risk factors, driver alertness, and/or emotional state. In some arrangements, the gamification module(s) 190 can be configured to operate automatically based on user preferences and/or an emotional state of a user.

The determinations made by any of the modules described herein can be provided to the gamification module(s) 190. For instance, the determinations made by the gaze module(s) 180 can be provided to the gamification module(s) 190. The gamification module(s) 190 can be configured to present the driving environment recreation to a user from a perspective of the user, as determined by gaze data.

Figure 4A:
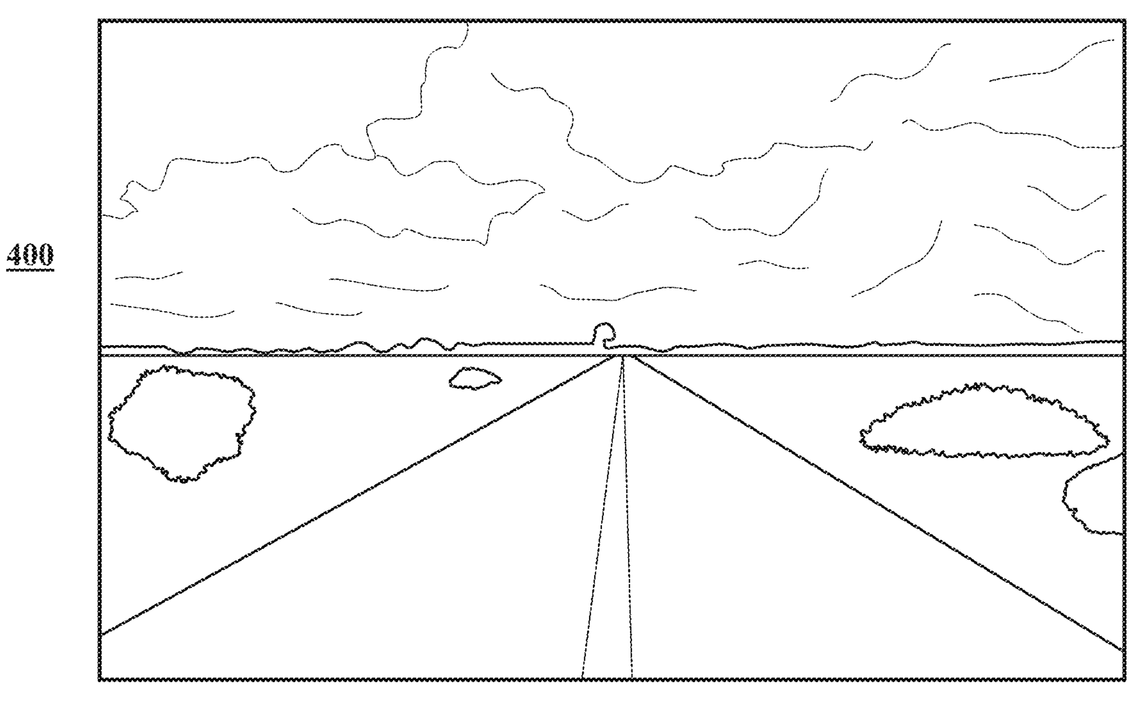
FIG. 4A is an example of a driving environment.

Non-limiting examples of gamification of the driving environment recreation will now be described. Referring to FIG. 4A, an example of a driving environment recreation 400 is shown. The driving environment recreation 400 can be an accurate depiction of a portion of the external environment of the vehicle. The driving environment may be relatively uninteresting to a vehicle occupant with flat land and few objects (e.g., a couple of bushes). The sky can be overcast and gray.

Figure 4B:
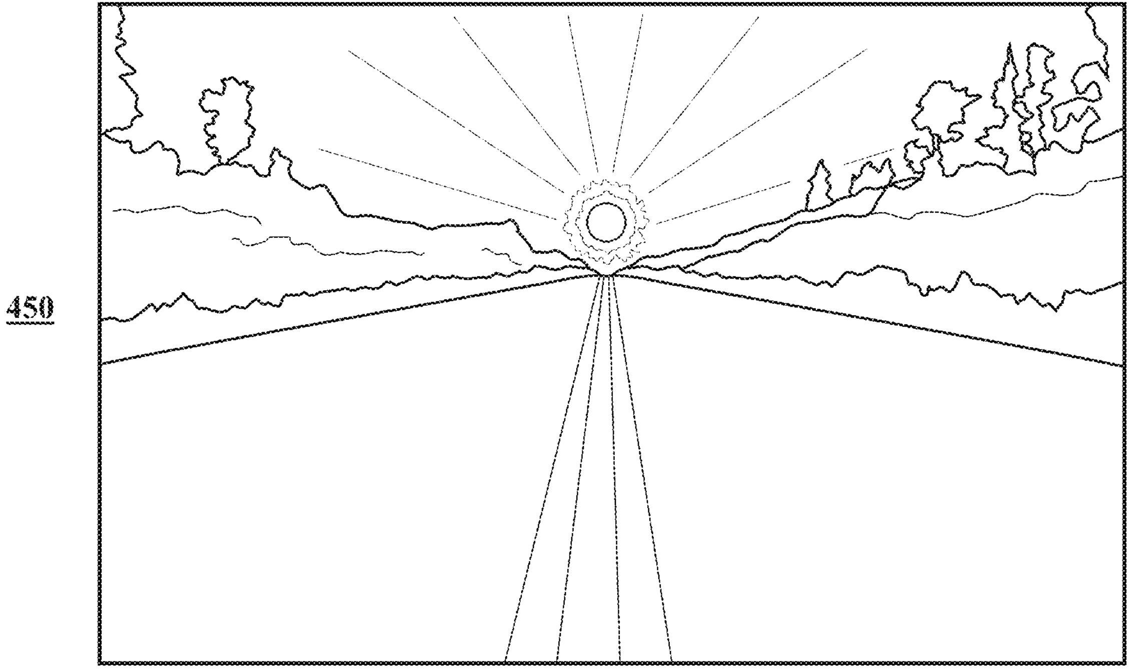
FIG. 4B is an example of a gamification of the driving environment.

The gamification module(s) 190 can gamify the driving environment recreation 400 to create a gamified driving environment recreation 450, as is shown in FIG. 4B. In this case, if the user's mood or emotional state is down and/or if a user's preference is for interesting landscapes and/or brighter skies, then the gamification module(s) 190 can gamify the driving environment recreation by creating a beautiful sunset and by making the landscape more appealing (e.g., by adding some elevation changes and vegetation). The gamified driving environment recreation 450 can be presented on a display. The gamified driving environment recreation 450 can help to improve the mood or emotional state of the vehicle occupant.

Figure 5:
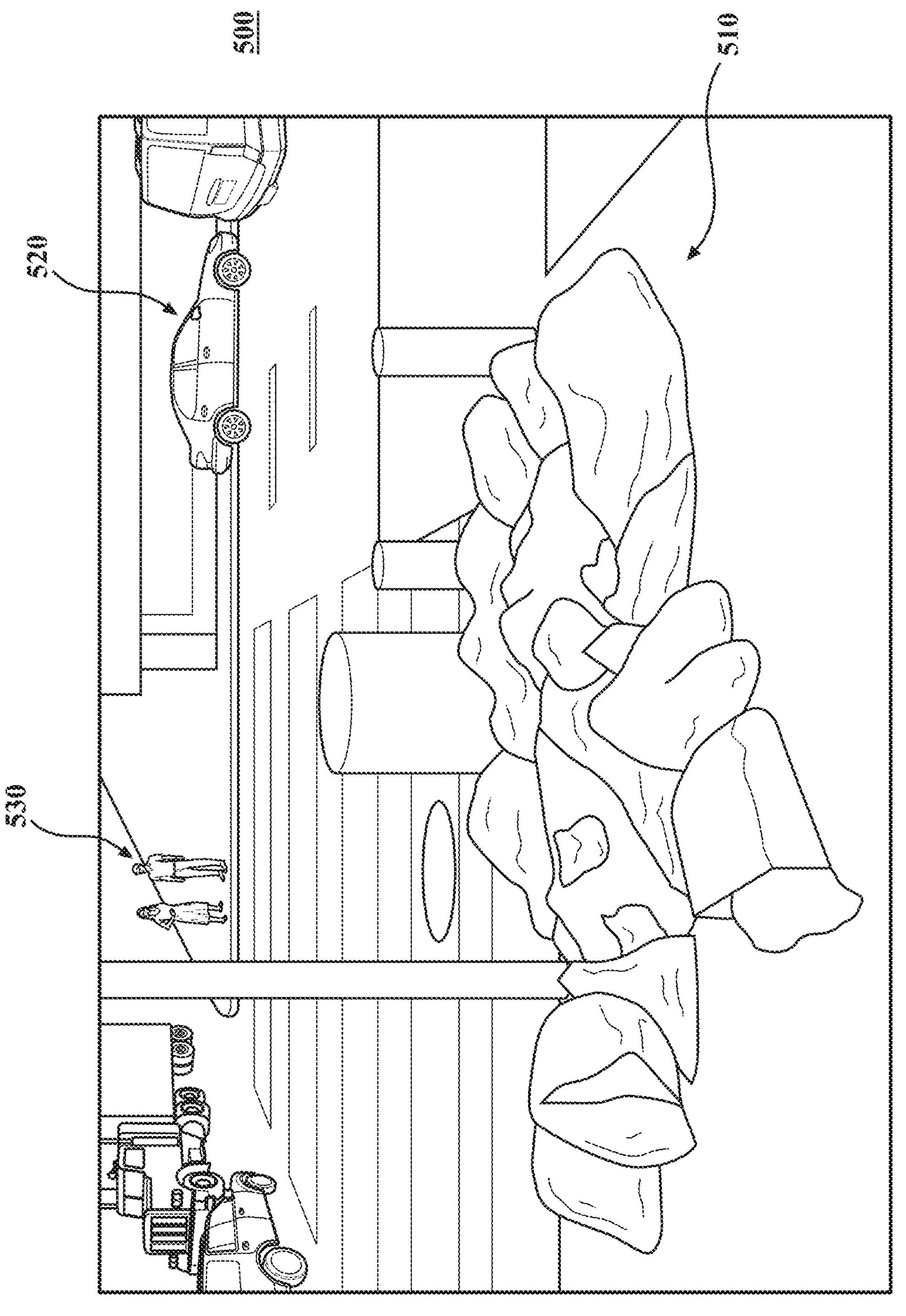
FIG. 5 is an example of a driving environment recreation.

Another example of the gamification of a driving environment is now shown in connection with FIGS. 5, 5A, 5B, and 5C. FIG. 5 shows an example of a driving environment recreation 500. The driving environment recreation 500 can include vehicles 520 and pedestrians 530. The driving environment can also include trash 510 piled up on the sidewalk near the street.

Figure 5A:
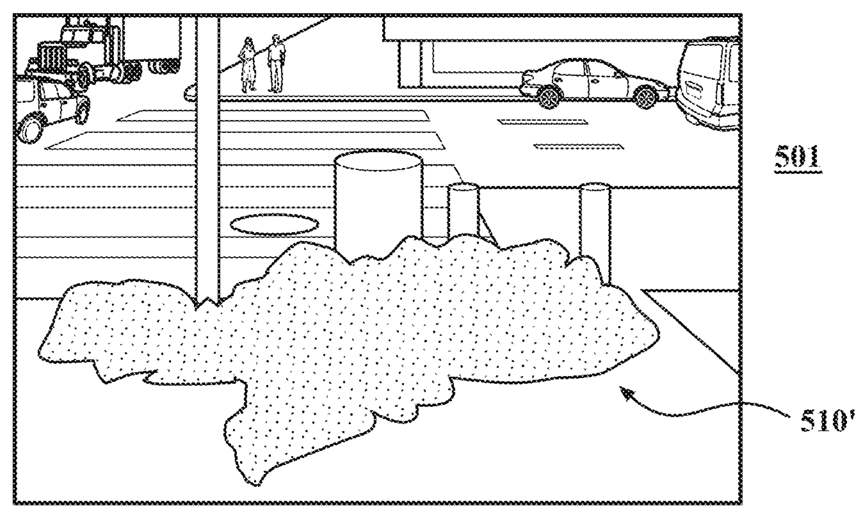
FIG. 5A is an example of a gamified driving environment recreation, wherein one or more objects are deemphasized by blurring.
Figure 5B:
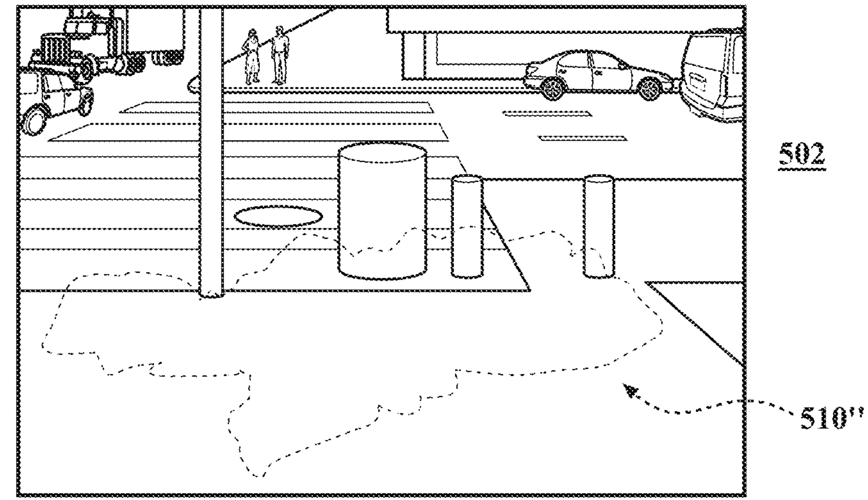
FIG. 5B is an example of a gamified driving environment recreation, wherein one or more objects are deemphasized by removal.
Figure 5C:
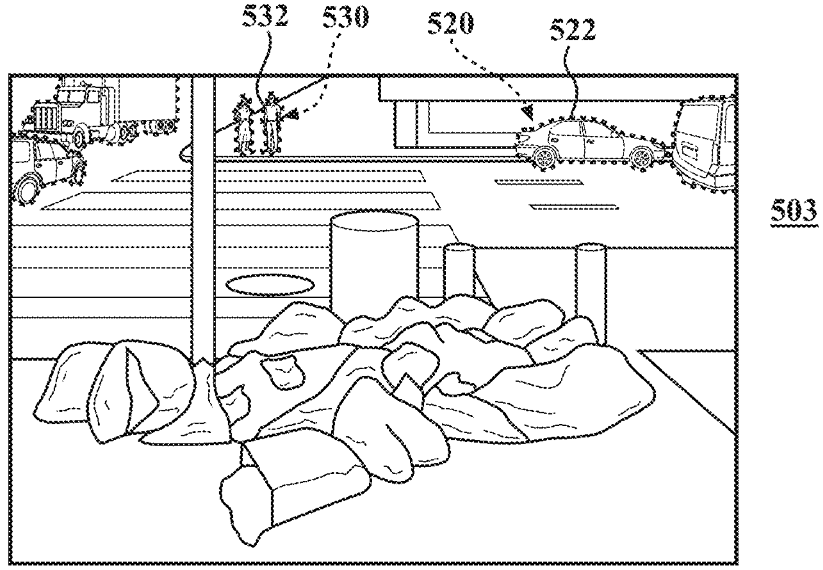
FIG. 5C is an example of a gamified driving environment recreation, wherein one or more objects are emphasized by highlighting.

The trash 510 can be identified by the object identification module(s) 165 and, based on the settings data 122, as a negative object. As such, the gamification module(s) 190 can gamify the driving environment recreation 500 to create a gamified driving environment recreation. Various examples of a gamified driving environment recreation are shown in FIGS. 5A-5C. While the gamified driving environment recreations are shown separately in FIGS. 5A-5C, it will be appreciated that any combination of the gamified driving environment recreations can be generated.

With respect to FIG. 5A, a first gamified driving environment recreation 501 is shown. The driving environment recreation can be gamified by causing the trash to be blurred 510'. In FIG. 5B, a second gamified driving environment recreation 502 is shown. The driving environment recreation can be gamified by causing the trash to be removed 510". In an alternative approach, the trash can be replaced with some other object or thing that is more appealing. In FIG. 5C, a third gamified driving environment recreation 503 is shown. Critical objects in the driving environment recreation can be emphasized. For instance, vehicle(s) 520 in the driving environment recreation 500 can be highlighted 522. As another example, pedestrian(s) 530 in the driving environment recreation 500 can be highlighted 532.

Of course, it will be appreciated that the above examples are non-limiting. It will be further appreciated that there are numerous ways of emphasizing, deemphasizing, removing, and/or adding to the driving environment recreation.

Additional examples of scenarios in which gamification can be helpful will now be described. For instance, driving at night can be challenging and difficult. However, according to arrangements described herein, driving environment data can be detected by the driving environment sensor(s) 134, such as one or more lidar sensors. A driving environment recreation can be generated using the driving environment data. The driving environment recreation can be gamified by making it appear that the vehicle is driving during the day.

As another example, a vehicle occupant may be colorblind. Consequently, the vehicle occupant may not be able to see certain colors. Arrangements described herein can be used to gamify a driving environment recreation to enhance the contrast of certain objects, thereby helping the vehicle occupant to perceive the driving environment more clearly, which, in turn, can facilitate driving safety.

Figure 6:
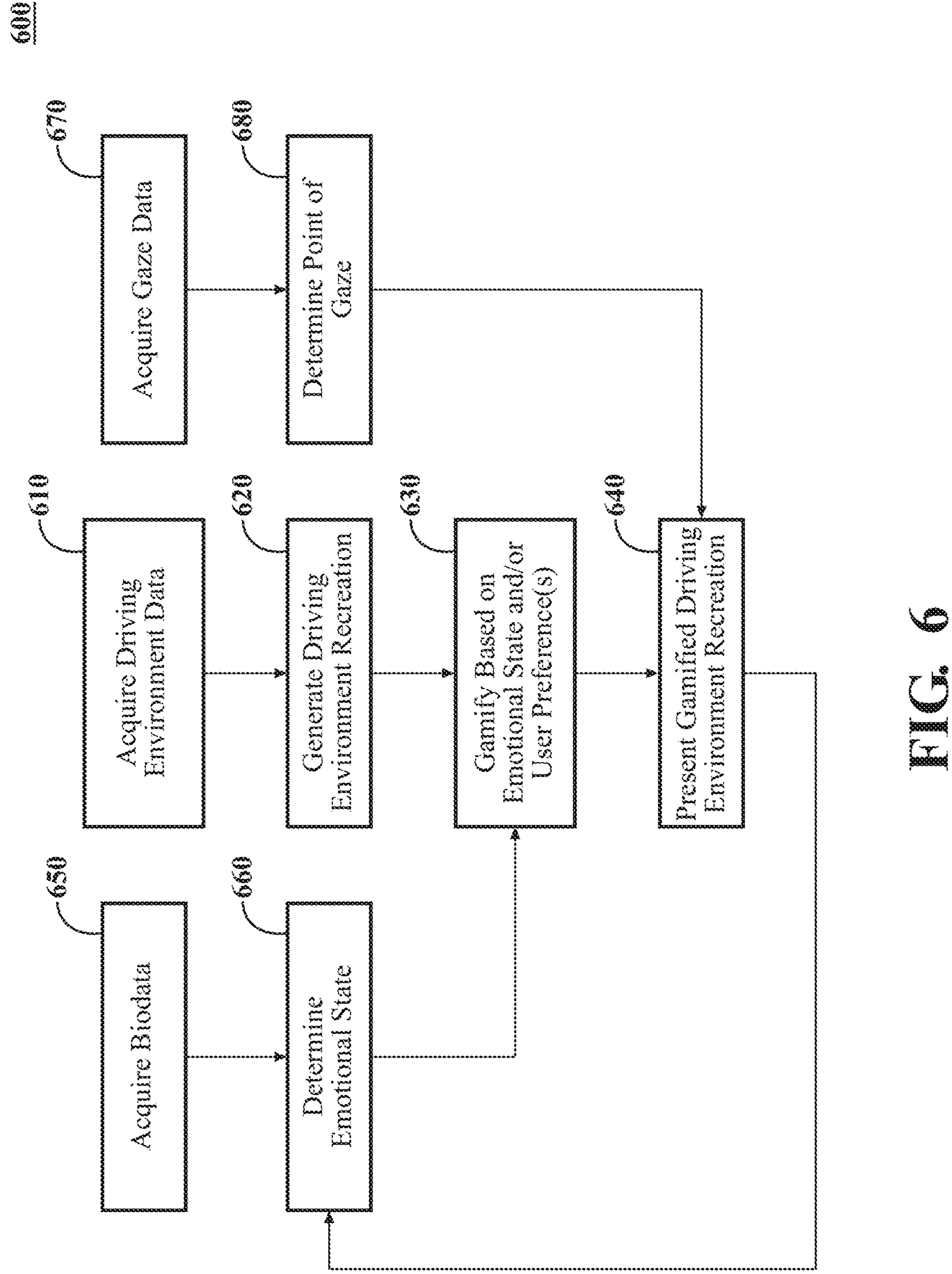
FIG. 6 is an example of a process for gamifying a driving environment.

The gamification module(s) 190 can be configured to gamify a driving environment recreation in any suitable manner. One example of a process 600 for gamifying a driving environment recreation is shown in FIG. 6. The process 600 can include other steps that are not shown here, and in fact, the process 600 is not limited to including every block shown. The blocks that are illustrated here as part of the process 600 are not limited to the particular chronological order. Indeed, some of the blocks may be performed in a different order than what is shown and/or at least some of the blocks shown can occur simultaneously.

For discussion purposes, the process 600 can begin at block 610. At block 610, driving environment data can be captured by one or more driving environment sensors 134. The process 600 can continue to block 620. At block 620, a driving environment recreation can be created using the driving environment data. In some instances, the driving environment recreation can also be created using the driving environment data from connected entities 260 and/or the map data 124. The driving environment recreation can be three dimensional and can be a 360 degree view. The driving environment recreation can be created by the environment recreation module(s) 170 and/or the processor(s) 110. The process 600 can continue to block 630.

At block 630, the driving environment recreation can be gamified based on an emotional state of a vehicle occupant and/or user preference(s). Such gamification can be performed by the gamification module(s) 190 and/or the processor(s) 110. The emotional state of the vehicle occupant can be determined by the emotion module(s) 160 and/or the processor(s) 110. The user preference(s) can be provided in the settings data 122. The process 600 can continue to block 640.

At block 640, the gamified environment can be caused to be presented on a display. Such causing can be performed by the gamification module(s) 190 and/or the processor(s) 110. The display can be the display(s) 150.

The emotional state of the vehicle occupant can be determined in blocks 650 and 660. For instance, in block 650, biodata of a vehicle occupant can be acquired by the occupant sensor(s) 136. The biodata can be used by the emotion module(s) 160 and/or the processor(s) 110 to determine an emotional state of the vehicle occupant. The emotion module(s) 160 can also use the emotion data 126 stored in the data store(s) 120.

The determined emotional state can be provided to the gamification module(s) 190. It should be noted that the determination of the emotional state at block 660 can be performed continuously, periodically, irregularly, or even randomly. After the gamified driving environment recreation is presented on the display at block 640, the process 600 can return to block 660 for a new emotional state determination. Feedback can be provided on the emotional state determination to improve the driver's overall state and adjust the environment accordingly.

The portion of the gamified driving environment to be displayed can be determined with respect to the gaze of a user (e.g., a wearer of an XR device 250). To that end, data from accelerometer(s) 710 and/or camera(s) 720 associated with the XR device 250 can be acquired at block 670. Using such data, the point of gaze of the wearer can be determined at block 680. Such a determination can be made by the gaze module(s) 180 and/or the processor(s) 110. The determined point of gaze can be supplied to the gamification module(s) 190 to determine the appropriate portion of the gamified driving environment recreation to present to a user. It will be appreciated that such an approach can save computational power by rendering the appropriate portion of the gamified driving environment recreation.

The various elements of the vehicle 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets.

The communication network(s) 195 further can be implemented as or include one or more wireless networks, whether short or long range. For example, in terms of short-range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 195 can include a mobile, cellular, and/or satellite-based wireless network and support voice, video, text, and/or any combination thereof. Examples of long-range wireless networks can include GSM, TDMA, CDMA, WCDMA networks or the like. In one or more arrangements, the communication network(s) 195 can include Vehicle-to-Vehicle (V2V), Vehicle-to-Infrastructure (V2I), or Vehicle-to-Everything (V2X) technology, which can allow for communications between one or more elements of the vehicle 100 and/or one or more elements located remote from the vehicle 100. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like.

One or more elements of the vehicle 100 can include and/or can execute suitable communication software, which enables two or more of the elements to communicate with each other through the communication network(s) 195 and perform the functions disclosed herein.

The vehicle 100 can be part of a larger system. FIG. 2 is an example of a system 200. The system 200 can include various elements. Some of the possible elements of the system 200 are shown in FIG. 2 and will now be described. The system 200 can have any combination of the various elements shown in FIG. 2. Further, the system 200 can have additional elements to those shown in FIG. 2. Of course, it will be understood that it is not necessary for the system 200 to have all of the elements shown in FIG. 2 or described herein. Further, the elements shown may be physically separated by large distances. Indeed, one or more of the elements can be located remotely from the other elements.

The system 200 can include the vehicle 100, one or more processors 210, one or more data stores 220, one or more server(s) 230, one or more gamification modules 290, one or more extended reality (XR) devices 250, and/or one or more connected entities 260. The various elements of the system 200 can be communicatively linked through one or more communication networks 295. The above discussion of the communication network(s) 195 in connection with FIG. 1 applies equally to the communication network(s) 295 in FIG. 2. Further, while FIG. 2 only shows the gamification module(s) 290, it will be appreciated that the system 200 can include any of the modules described in connection with FIG. 1 above.

With respect to the processor(s) 210, the data store(s) 220 (including settings data 222, map data 224, emotion data 226, and object data 228), and the gamification module(s) 290, the above discussion of the processor(s) 110, the data store(s) 120 (including the settings data 122, the map data 124, the emotion data 126, and the object data 128), and the gamification module(s) 190 in connection with FIG. 1 applies equally here. Indeed, the processor(s), the data store(s), and/or the gamification module(s) can be located entirely on the vehicle 100, entirely remote from the vehicle 100, or partially on the vehicle 100 and partially remote from the vehicle 100. It will be appreciated that the above discussion of the vehicle 100 in connection with FIG. 1 applies equally to the vehicle 100 shown in the system 200 of FIG. 2. Further, the system 200 can include any of the other modules described in connection with FIG. 1.

The system 200 can include one or more servers 230. The server(s) 230 can be located remote from the vehicle 100 and/or the connected entities 260. The server(s) 230 can be any type of server, now known or later developed. In some arrangements, the server(s) 230 can be cloud-based server(s) or edge server(s). The server(s) 230 can communicate with the vehicle 100 and/or with the connected entities 260 over the communication network 295.

The system 200 can include one or more extended reality (XR) devices 250. Extended reality (XR) refers to any combination of real-and-virtual environments, including an entirely virtual environment. Examples of XR include augmented reality (AR), mixed reality (MR), virtual reality (VR), and any type of reality in between these types of XR.

In some arrangements, the XR device(s) 250 can be a part of the vehicle 100, such as one or more displays 150. In some arrangements, the XR device(s) 250 can be part of another device located in the vehicle 100 and/or operatively connected to the vehicle 100. Examples of such XR devices can include a wearable device, such as a head mounted display, an extended reality headset, smart eyeglasses, smart goggles, and smart contact lenses. In some arrangements, the XR device(s) 250 can include eye tracking or gaze tracking technology. In some arrangements, the XR device(s) 250 can include one or more sensors to acquire information about the environment of the wearer.

In some arrangements, the XR device(s) 250 can include a display in which XR content can be presented. In some arrangements, video or images captured by one or more cameras (or other driving environment sensors) can be fed into the XR device(s) 250 so that the wearer can perceive the real-world environment in real-time. As an example, the XR device(s) 250 can include a video pass through display in which real-time video of the real-world environment can be passed through to the display. The video can be augmented in some manner with XR content, such as by providing further content in place of, in addition to, overlaid on, and/or a modification of real-world video content.

The XR device(s) 250 can be any type of XR device, now known or later developed. The XR device(s) 250 can include one or more cameras. In one or more arrangements, the camera(s) can be stereo camera(s) or any other type of camera(s). The camera(s) can be configured to capture video of the environment in front of the wearer. Thus, the camera(s) can generally correspond to the point of view of the wearer. The captured video can be passed to the display(s) 150 within the XR device(s) 250. Thus, the user can see the real-world environment through the XR device(s) 250.

In some arrangements, the XR device(s) 250 can be configured to present a view corresponding to a view of a driver or other occupant of the vehicle 100. The view presented on the XR device(s) 250 can vary with movements of the driver's head and/or eyes. The XR device(s) 250 and/or the vehicle 100 can include eye tracking or head tracking such that, as the field of vision of the person changes, the content presented on the XR device(s) 250 changes.

Referring to FIGS. 7A-7C, an example of an XR device 250 is shown. In this example, the XR device 250 can be XR glasses 700. The XR glasses 700 can include lenses 705. The lenses 705 of the XR glasses 700 can be configured to alternate between transparent or opaque based on user command or preference. The XR glasses 700 can be operatively connected to vehicle 100 to share information. In some arrangements, the entire surface of the lenses 705 can be configured to act as an XR display, as is shown in FIGS. 7A-7B. Alternatively, the XR glasses 700 can be configured such that only a portion 750 of the lenses 705 acts as an XR display. In such cases, the remainder of the lenses 705 can remain transparent. An example of such an arrangement is shown in FIG. 7C.

The XR glasses 700 can include one or more sensors to help detect direction and point of gaze. For instance, the XR glasses 700 can include one or more accelerometers 710, as shown in FIG. 7A. In some instances, the accelerometer(s) 710 can be located on an inner side of the XR glasses 700. The accelerometer(s) 710 can acquire movement data about movement of the XR glasses 700. Alternatively or additionally, the XR glasses 700 can include one or more cameras 720, as shown in FIG. 7B. The camera(s) 720 can acquire visual data. In some instances, the camera(s) 720 can be located on an outer side of the XR glasses 700. In some arrangements, the accelerometer(s) 710 and the camera(s) 720 can work in combination to detect direction and point of gaze.

The XR glasses 700 can be calibrated to a wearer. For instance, in personal calibration, a subject can be asked to look at N calibration points on the screen one at a time, and each calibration point can be looked at with M different head poses. The person's field of view can be adjusted based on calibration.

Figure 9:
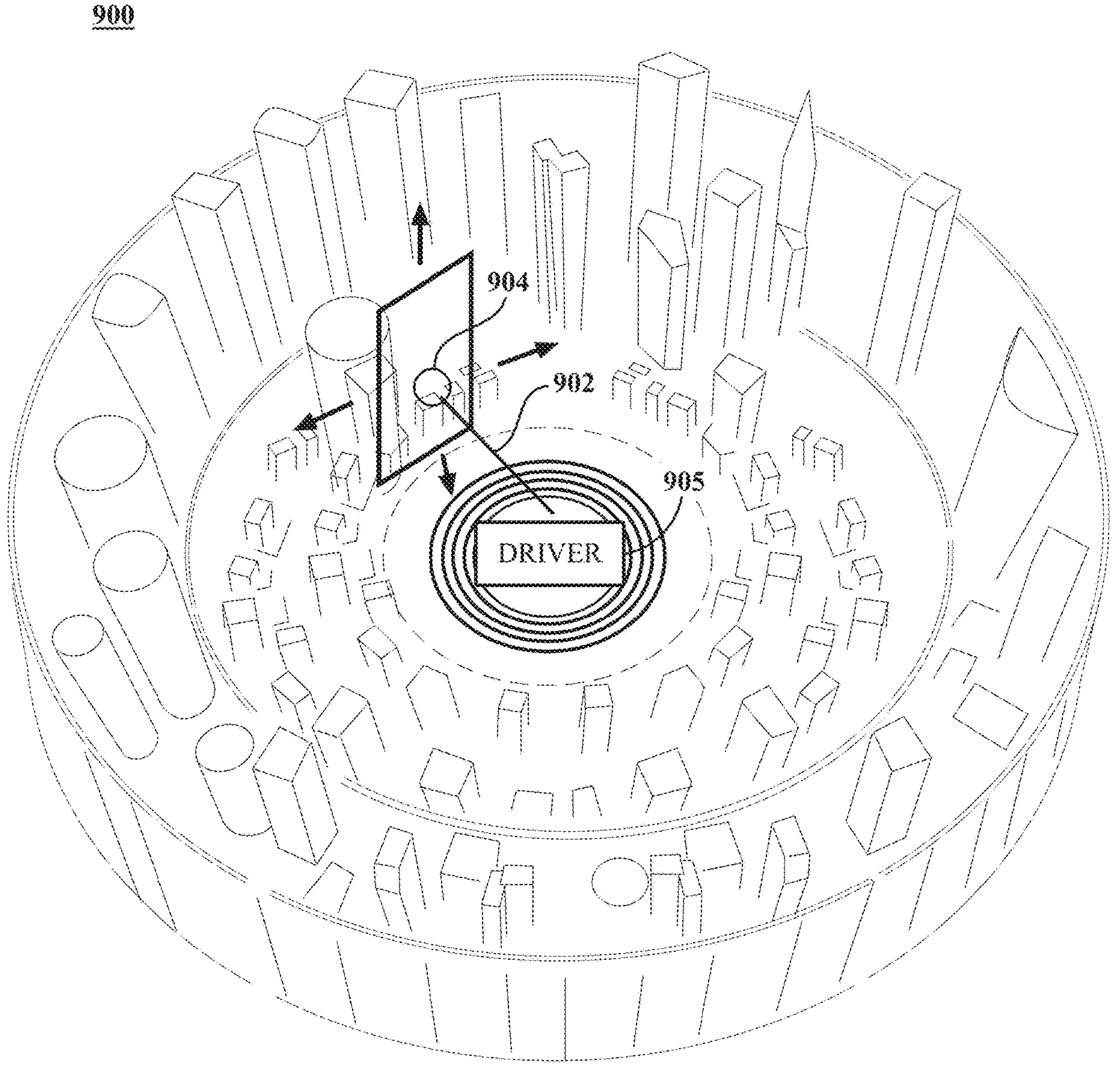
FIG. 9 is an example of a three dimensional surrounding environment of a driver, showing a point of gaze of the driver usable to determine a location of a field of view in the environment.

Referring to FIG. 9, the field of view can be personalized and can move in all four directions and in depth within a three dimensional space 900. A line of gaze 902 and a point of gaze 904 can be used to determine the location of the field of view of the driver 905 in the three dimensional space 900. It will be appreciated that this approach to determining the field of view can help to save computational power by only gamifying the portion of the environment where the driver is looking. In some arrangements, the field of view can include zoom in/out capabilities. In such instances, a user can selectively zoom in and out of the field of view.

In some arrangements, the system 200 can include one or more connected entities 260. A connected entity can include any device that is communicatively coupled to the server(s) 230 and/or the vehicle 100. Non-limiting examples of the connected entities 260 include one or more connected vehicles, one or more connected infrastructure devices, and/or one or more connected personal devices. The vehicle 100 can be configured to communicate directly with the connected entities 260 and/or via the server(s) 230. The connected entities 260 can provide data or information to any of the elements in the system 200 or the vehicle 100. Such data and information can be useful in creating a driving environment recreation and/or in gamifying the driving environment recreation.

With respect to the connected vehicle(s), the above discussion of the vehicle 100 in FIG. 1 can apply equally to the connected vehicle(s). The connected vehicle(s) can be any vehicle. The connected vehicle(s) can be configured to acquire driving environment data. In some arrangements, the connected vehicle(s) can be configured to send and/or receive information to the server(s) 230. In some arrangements, the windows of the connected vehicle(s) can serve as displays. Vehicle coordination can be used to show visual data (e.g., images, video, etc.) on the windows instead of the driver being visible through the window.

Regarding the connected infrastructure device(s), an "infrastructure device" can be any device positioned along or near a road or other travel path. The connected infrastructure device(s) can be configured to acquire driving environment data. The connected infrastructure device(s) can be configured to acquire driving environment data. The connected infrastructure device(s) include one or more sensors for sensing the surrounding environment and/or for sensing vehicles, structures, pedestrians, and/or other objects in the environment. The discussion of the driving environment sensors 134 in connection with FIG. 1 is applicable to the environment sensors of the connected infrastructure device(s).

The connected infrastructure device(s) can be, for example, a CCTV camera, a roadside camera, a road side unit (RSU), a street light, traffic light, a smart traffic light, a traffic sign, a road sign, a billboard, a bridge, a building, a pole, or a tower, just to name a few possibilities. In some instances, the connected infrastructure device(s) can be a road itself when the operative components are embedded therein. In some arrangements, the connected infrastructure device(s) can be configured to send and/or receive information to the server(s) 230.

The connected personal device(s) can include any portable device worn or carried by a person, now known or later developed. The connected personal device(s) can include one or more environment sensors for sensing at least a portion of the surrounding environment of the connected personal device(s). The discussion of the driving environment sensors 134 in connection with FIG. 1 is applicable to the environment sensors of the connected personal device(s).

Examples of the connected personal device(s) can include a telephone (e.g., a cellular telephone, a smart phone, etc.) a computer (e.g., a laptop, a tablet, a phablet, etc.), and/or any other portable computing device. In one or more arrangements, the connected personal device(s) can include a smart watch, smart eye glasses, smart jewelry (e.g., necklace, earrings, bracelets, etc.), gaze tracking enabled goggles, smart contact lenses, and/or smart clothing (e.g., a shirt, hat, or other article of clothing enabled for wireless communication).

The connected entities 260 can be configured to acquire driving environment data. The connected entities 260 can be configured to communicate directly with the vehicle 100 and/or the connected entities 260 or indirectly via the server(s) 230.

In some instances, driving environment data acquired by the connected entities 260 can be sent to the server(s) 230. In some arrangements, the server(s) 230 can be configured to analyze the acquired sensor data. In some arrangements, the server(s) 230 can be configured to send driving environment data acquired by the connected entities 260 to the vehicle 100.

Now that the various potential systems, devices, elements and/or components of the vehicle 100 and/or the system 200 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 3:
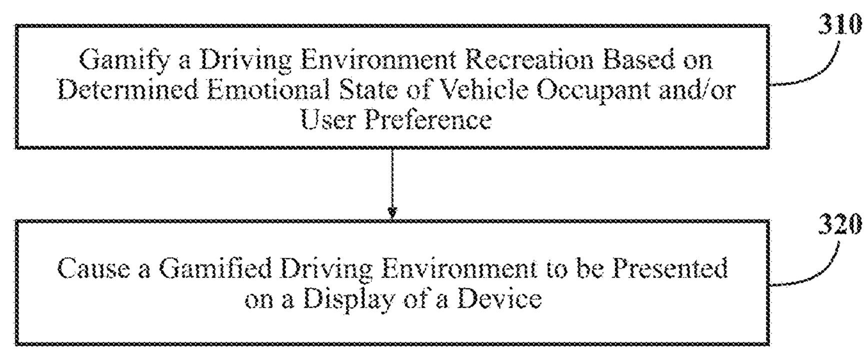
FIG. 3 is an example of a method.

Turning to FIG. 3, an example of a method 300 is shown. At block 310, a recreation of a driving environment of a vehicle can be gamified based on a determined emotional state of a vehicle occupant and/or a user preference. The recreation of the driving environment can be generated by the environment recreation module(s) 170 and the processor (s) 110. The environment recreation module(s) 170 and the processor(s) 110 can use information or data acquired by the driving environment sensor(s) 134 and/or received from the connected entities 260. The environment recreation module (s) 170 can also use the map data 124.

The gamification of the recreation of the driving environment can be performed by the gamification module(s) 190 and/or the processor(s) 110. The gamification module(s) 190 and/or the processor(s) 110 can use the settings data 122 to obtain user preferences and to identify critical and non-critical objects in the driving environment. The emotional state of the vehicle occupant can be determined by the emotion module(s) 160 and/or the processor(s) 110. The emotion module(s) 160 and/or the processor(s) 110 can use the emotion data 126 and occupant data obtained by the occupant sensor(s) 136 to determine an emotional state of the vehicle occupant. The method 300 can continue to block 320.

At block 320, the gamified recreation of the driving environment can be caused to be presented on a display. Such causing can be performed by the processor(s) 110 and/or the gamification module(s) 190. The display can be the display(s) 150 within the vehicle 100, or the display can be a display of the XR device 250. In some instances, the processor(s) 110 and/or the gamification module(s) 190 can prompt a user for permission to cause the gamified recreation of the driving environment to be presented on the display.

The method 300 can end. Alternatively, the method 300 can return to block 310 or to some other block. The method 300 can be repeated at any suitable point, such as at a suitable time or upon the occurrence of any suitable event or condition.

It should be noted that arrangements described herein can be used with respect to a driver or a passenger of the vehicle 100. Features related to passenger enjoyment can also be utilized to reduce stress for the driver through a more immersive and entertaining experience for passengers hence relieving the driver of some passenger-related distractions. Thus, passengers also could have their own gamification experience, either independently or collaboratively (in a gaming environment). In some arrangements, the passenger of the vehicle 100 can share his or her content in the gamified environment with one or more other passengers of the vehicle 100. Alternatively or additionally, the passenger of the vehicle 100 can share his or her content in the gamified environment with people located outside of or remote from the vehicle. For instance, the passenger of the vehicle 100 can share his or her content in the gamified environment with one or more people online. Such sharing can be performed by the communication network(s) 295. In some arrangements, these other people can interact with the passenger in the gamified environment. Passengers can synchronize their physiological or emotional state, as recorded through wearables, biosensors, or non-contact sensors or electrodes implemented within the vehicle 100, with the XR glasses 700 or other XR device 250. Individuals can select or customize characters to represent themselves or others, such as choosing avatars that resemble popular characters. The entire experience for passengers can be recorded for playback for posterity or personal record purposes.

It will be appreciated that arrangements described herein can provide numerous benefits, including one or more of the benefits mentioned herein. For example, arrangements described herein can boost a vehicle occupant's mood, level of alertness, and/or emotional state. As such, arrangements described herein can facilitate safety. Arrangements described herein can understand environmental features and objects in a driving scenario that correlate with risk factors, driver alertness, and emotional state. Arrangements described herein can gamify a driving environment. Arrangements described herein can enable the amount of gamification to be varied based on real-time conditions. Arrangements described herein can keep/highlight the key features that correspond to road safety to improve the user experience. Arrangements described herein can measure a driver's emotional state (or other vehicle occupant's emotional state) through physiological signals to understand how each feature and mode affects their mood, alertness, and/or emotion.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:

acquiring sensor data of a driving environment of a vehicle;

generating a recreation of the driving environment based on the acquired sensor data, the recreation being three dimensional and a 360 degree view around the vehicle, the recreation being dynamically updated for consistency with real-time conditions in the driving environment;

gamifying the recreation of the driving environment based on a determined emotional state of a vehicle occupant and/or a user preference; and causing the gamified recreation of the driving environment to be presented on a display of a device.

2. The method of claim 1, wherein the device is worn by the vehicle occupant.

3. The method of claim 1, wherein the device is a window or windshield of the vehicle.

4. The method of claim 1, further including:

determining a point of gaze of the vehicle occupant; and altering the gamified recreation of the driving environment based on the determined point of gaze.

5. The method of claim 4, further including:

acquiring movement data about movement of the device; and acquiring visual data of the device, wherein determining a point of gaze of the vehicle occupant is based on the movement data and/or the visual data.

6. The method of claim 1, further including:

acquiring biodata of the vehicle occupant; and determining an emotional state of the vehicle occupant based on the acquired biodata.

7. The method of claim 1, wherein the sensor data covers substantially 360 degrees around the vehicle.

8. The method of claim 1, wherein causing the gamified recreation of the driving environment to be presented on a display of a device includes causing the gamified recreation of the driving environment to be presented on only a portion of the display.

9. The method of claim 1, wherein gamifying the recreation of the driving environment includes altering the recreation to improve a mood of the vehicle occupant.

10. The method of claim 1, wherein gamifying a recreation of a driving environment includes deemphasizing an object in the recreation.

11. The method of claim 1, wherein gamifying a recreation of a driving environment includes emphasizing an object in the recreation.

12. The method of claim 1, further including:

causing the gamified recreation of the driving environment to be shared between two passengers of the vehicle or between one passenger of the vehicle and a person located remote from the vehicle.

13. A system comprising:

a device including a display; and a processor configured to:

acquire sensor data of a driving environment of a vehicle;

generate a recreation of the driving environment based on the acquired sensor data, the recreation being three dimensional and a 360 degree view around the vehicle, the recreation being dynamically updated for consistency with real-time conditions in the driving environment;

gamify the recreation of the driving environment based on a determined emotional state of a vehicle occupant and/or a user preference; and cause the gamified recreation of the driving environment to be presented on the display.

14. The system of claim 13, wherein the device is worn by the vehicle occupant.

15. The system of claim 14, wherein the device is an extended reality device.

16. The system of claim 13, wherein the device is a window of the vehicle.

17. The system of claim 13, wherein the processor is further configured to:

determine a point of gaze of the vehicle occupant; and alter the gamified recreation of the driving environment based on the determined point of gaze.

18. The system of claim 13, further including an occupant sensor configured to acquire biodata of the vehicle occupant, and wherein the processor is further configured to determine an emotional state of the vehicle occupant based on the acquired biodata.

19. The system of claim 13, further including one or more driving environment sensors configured to acquire driving environment data about the driving environment of the vehicle, and wherein the processor is further configured to generate a three dimensional recreation of the driving environment based on the acquired driving environment data.

20. The system of claim 13, wherein causing the gamified recreation of the driving environment to be presented on a display of a device includes causing the gamified recreation of the driving environment to be presented on only a portion of the display.

21. The system of claim 13, wherein gamifying a recreation of a driving environment includes altering the recreation to improve a mood of the vehicle occupant.

22. The system of claim 13, wherein gamifying a recreation of a driving environment includes deemphasizing an object in the recreation or emphasizing an object in the recreation.

23. The system of claim 13, wherein the processor is further configured to:

cause the gamified recreation of the driving environment to be shared between two passengers of the vehicle or between one passenger of the vehicle and a person located remote from the vehicle.

24. The method of claim 1, wherein the driving environment recreation is further generated using the driving environment data from one or more connected entities and/or map data.

25. The method of claim 1, wherein the driving environment recreation is viewable from a plurality of different perspectives including a driver's perspective, a passenger's perspective, and/or one or more perspectives from outside of the vehicle.

26. The method of claim 1, wherein features or objects in the gamified recreation of the driving environment that correspond to road safety are unaltered or are highlighted.

27. The method of claim 1, wherein an amount of gamification of the recreation of the driving environment is varied based on real-time conditions.

* * * * *